(12) United States Patent
Peter

(10) Patent No.: US 12,393,361 B2
(45) Date of Patent: Aug. 19, 2025

(54) MEMORY DEVICE REGION ALLOCATION USING LIFETIME HINTS

(71) Applicant: Micron Technology, Inc., Boise, ID (US)

(72) Inventor: Eldhose Peter, Bengaluru (IN)

(73) Assignee: MICRON TECHNOLOGY, INC., Boise, ID (US)

(*) Notice: Subject to any disclaimer, the term of this patent is extended or adjusted under 35 U.S.C. 154(b) by 0 days.

(21) Appl. No.: 18/508,112

(22) Filed: Nov. 13, 2023

(65) Prior Publication Data

US 2024/0176527 A1    May 30, 2024

Related U.S. Application Data

(60) Provisional application No. 63/385,011, filed on Nov. 26, 2022.

(51) Int. Cl.
*G06F 3/06* (2006.01)
(52) U.S. Cl.
CPC .......... *G06F 3/0647* (2013.01); *G06F 3/0604* (2013.01); *G06F 3/0635* (2013.01); *G06F 3/0683* (2013.01)

(58) Field of Classification Search
CPC .... G06F 3/0647; G06F 3/0604; G06F 3/0635; G06F 3/0683; G06F 3/0616; G06F 3/0679
See application file for complete search history.

(56) References Cited

U.S. PATENT DOCUMENTS

| 2013/0326121 A1* | 12/2013 | Cheng | G06F 12/0246 711/103 |
| 2018/0121109 A1* | 5/2018 | Li | G06F 12/0246 |
| 2021/0064287 A1* | 3/2021 | Kanno | G06F 3/0659 |

* cited by examiner

*Primary Examiner* — Michael Krofcheck
(74) *Attorney, Agent, or Firm* — NICHOLSON DE VOS WEBSTER & ELLIOTT LLP

(57) ABSTRACT

Methods, systems, and apparatuses include receiving a lifetime hint for a zone, where the lifetime hint is an estimation of a length of time user data for the zone will be valid. It is determined that the zone has been fully written to a source memory region. A destination memory region is determined to store the user data for the zone using the lifetime hint. The user data for the zone is moved from the source memory region to the destination memory region.

20 Claims, 6 Drawing Sheets

MEMORY DEVICE REGION ALLOCATION USING LIFETIME HINTS

CROSS-REFERENCE TO RELATED APPLICATION

The present application claims the benefit of U.S. Provisional Patent Application No. 63/385,011 filed on Nov. 26, 2022, which is incorporated by reference herein in its entirety.

TECHNICAL FIELD

The present disclosure generally relates to memory device region allocation, and more specifically, relates to memory device region allocation using data lifetime estimate.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
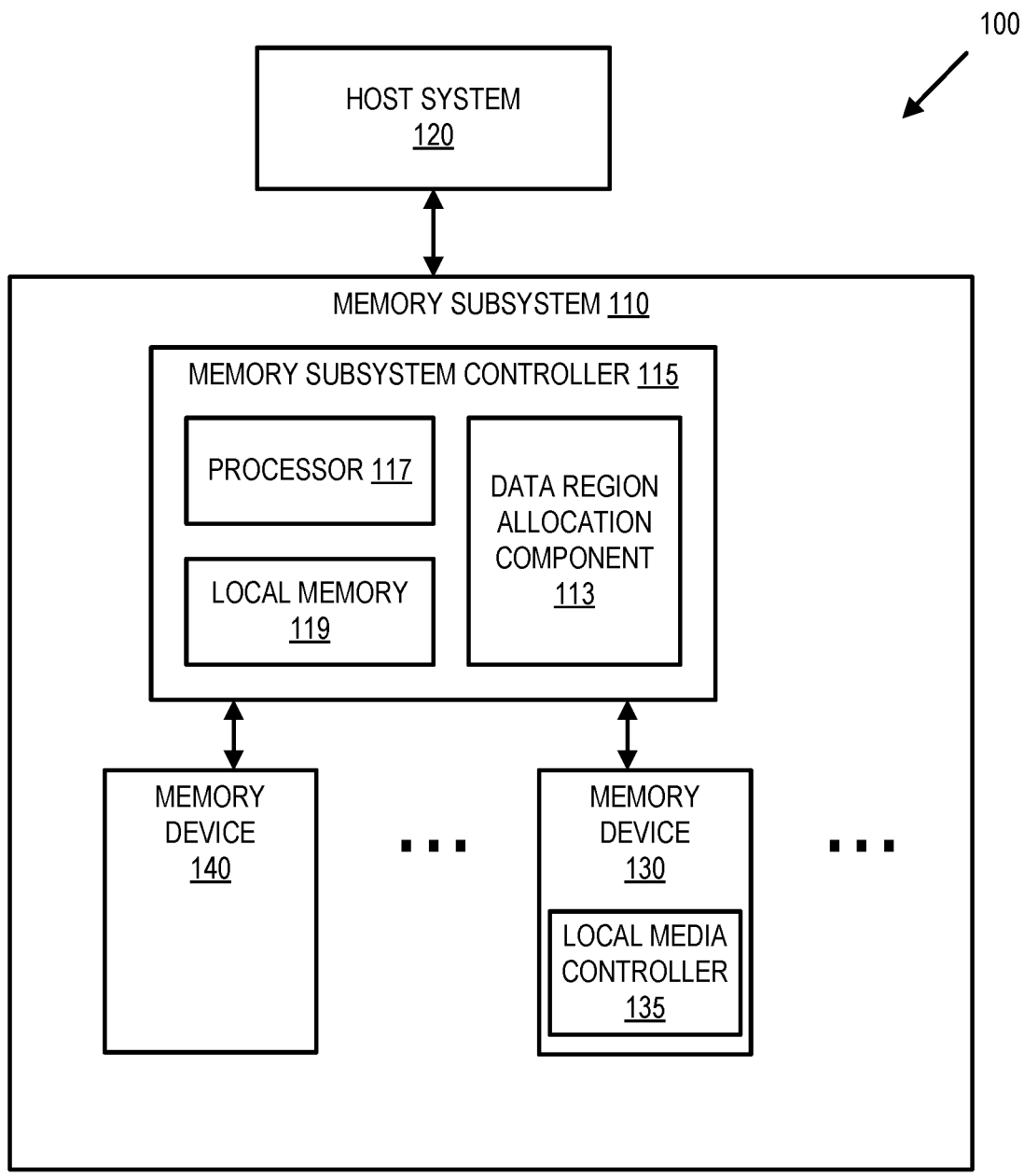
FIG. 1 illustrates an example computing system that includes a memory subsystem in accordance with some embodiments of the present disclosure.

Aspects of the present disclosure are directed to allocating data to memory device regions using lifetime hints in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, an SLC can store one bit of information and has two logic states.

Memory devices using zone namespaces and similar protocols divide memory into zones that each include a plurality of memory blocks or other addressable portions of memory. Such memory devices write data for zones sequentially (i.e., prohibiting random writes to memory blocks within a zone). Once a zone has been written completely, these memory devices reset an entire zone to modify/overwrite any data written in the zone. Some applications have data that is overwritten repeatedly in a relatively short period of time. Memory devices using zone namespace and similar protocols for such applications, therefore, reset zones repeatedly to satisfy the multiple overwrites. These multiple zone resets can lead to high amounts of write amplification (i.e., ratio of amount of data actually written to amount intended to be written). This high write amplification can then lead to degradation in data reliability for the memory device. Additionally, the high write amplification can result in high bandwidth consumption leading to a reduction in the random write performance of the memory device.

Aspects of the present disclosure address the above and other deficiencies by allocating data to different memory regions using lifetime hints. Lifetime hints are hints received from a host device or inferred by the memory device estimating an expected timespan (e.g., length of time) data will be stored before being overwritten. For example, memory subsystems receive data for a zone and put the data into a memory region with optimized program erase cycle performance (e.g., memory with low bit density, such as SLC memory, or similar memory that has less data reliability degradation than memory with higher bit density, such as MLC, TLC, QLC, etc.). Once the zone is written, if the memory subsystem determines the zone data is hot data (e.g., data with a lifetime hint indicating the data is expected to be overwritten soon), the memory subsystem stores the data in a memory region with optimized program erase cycle performance (e.g., memory with medium bit density, such as MLC memory, has less data reliability degradation than memory with higher bit density, such as TLC, QLC, etc.). If, the memory subsystem determines the zone data is cold data (e.g., data with a lifetime hint indicating the data is not expected to be overwritten soon/frequently), the memory subsystem instead stores the data in a memory region with optimized storage capabilities and with comparatively lower performance in terms of program erase cycles (e.g., memory with high bit density, such as QLC or PLC, stores more bits per cell than memory with low bit density). By determining the memory regions based on lifetime hints, the write amplification for portions of memory sensitive to degradation can be reduced. As a result, the memory device can improve data reliability by preventing degradation and reduce bandwidth consumption, leading to an increase in random write performance.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a data region allocation component 113 that can determine a memory region to store data using lifetime hints. In some embodiments, the controller 115 includes at least a portion of the data region allocation component 113. For example, the controller 115 can include a processing device 117 configured to execute instructions stored in local memory 119 for performing the operations described herein. In some embodiments, a data region allocation component 113 is part of the host system 120, an application, or an operating system.

The data region allocation component 113 can receive data from a host device and determine a memory region to store the data in using lifetime hints. For example, the host device can provide a lifetime hint that indicates a time or range of time that the data is estimated to remain valid. The data region allocation component 113 can use the lifetime hint to select between regions of differing characteristics to store the data. Further details with regards to the operations of the data region allocation component 113 are described below.

Figure 2:
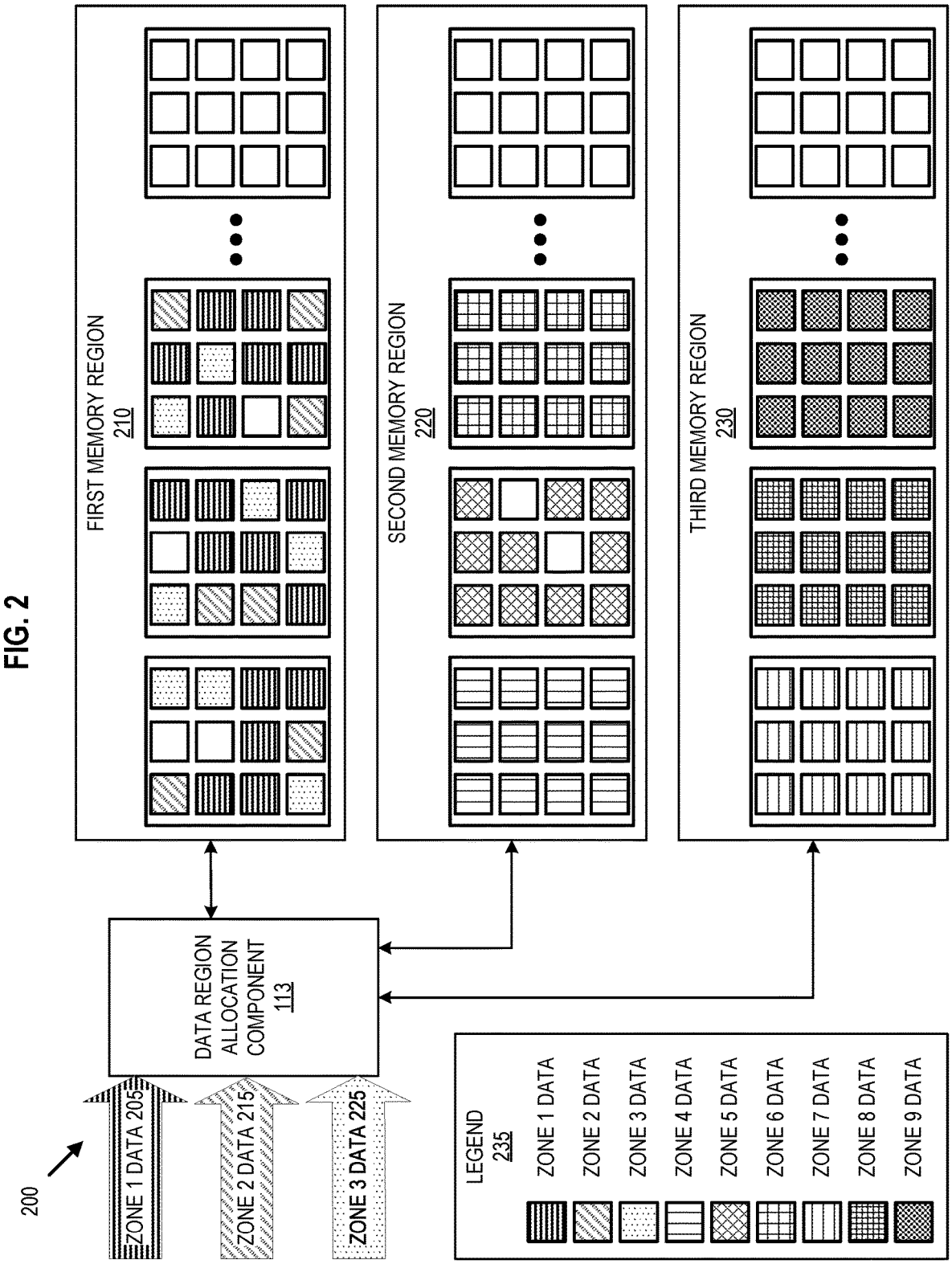
FIG. 2 illustrates an example system for memory device region allocation using lifetime hints in accordance with some embodiments of the present disclosure.

FIG. 2 illustrates an example system 200 for memory device region allocation using lifetime hints in accordance with some embodiments of the present disclosure. Example system 200 includes a data region allocation component 113 and first, second and third memory regions 210, 220, and 230. In some embodiments first, second, and third memory regions 210, 220, and 230 are part of a memory device, such as memory device 140 of FIG. 1. In some embodiments, one or more of first, second, and third memory regions 210, 220, and 230 are part of local memory, such as local memory 119 of FIG. 1. For example, first memory region 210 is part of local memory and second and third memory regions 220 and 220 are a part of a memory device. Although three memory regions are illustrated, embodiments can have any number of memory regions greater than two. Example system 200 also includes legend 235 to illustrate data of different zones and how data region allocation component 113 manages the allocation of memory regions and different zones within the memory regions.

Data region allocation component 113 receives zone 1 data 205, zone 2 data 215, and zone 3 data 225 from a host device, such as host system 120 of FIG. 1. Each of the zones is a grouping of data based on the usage and frequency of access of the zone data (e.g., 205, 215, and 225). For example, a zone is associated with an application running on a host device (e.g., a computer running a word processing application) and the zone includes data associated with the running of that application (e.g., word processing application files). In some embodiments, a zone is assigned for multiple applications with similar data usage and/or frequency of access. In some embodiments, a single application has data stored in multiple zones. In some embodiments, data region allocation component 113 uses a zoned namespaces (ZNS) protocol when receiving and processing zone data (e.g., 205, 215, and 225).

For example, a ZNS protocol includes a command set usable over NVMe and similar memory interfaces to expose memory storage divided into zoned blocks to a host device (such as host system 120 of FIG. 1. A ZNS protocol also includes an interface that allows the host device and the memory device, such as memory subsystem 110 of FIG. 1, to collaborate on data placement within the zones. These zones must be written sequentially and must be reset in order to rewrite/modify the written data. In some embodiments, each zone has attributes including at least one of: a write pointer that points to the next place in the zone to write sequentially, a zone starting point that points to the first portion of memory in the zone, a zone capacity that is a number of writeable portions of memory within the zone, and a zone state that defines read and write access rules for the zone.

In some embodiments, data region allocation component 113 receives a lifetime hint for each zone as well as the zone data (e.g., zone 1 data 205, zone 2 data 215, and zone 3 data 225). In some embodiments, data region allocation component 113 receives a lifetime hint from the host system 120. For example, data region allocation component 113 receives the lifetime hint in a zone management send command received from the host system 120. The zone management send command can include a reset zone command, an open zone command, a close zone command, and a finish zone command.

In some embodiments, the lifetime hint includes a lifetime hint value which specifies whether a data lifetime estimate for the zone exists and the value of the relative data lifetime of the zone as compared to the relative data lifetime of other zones in the memory device. For example, a lifetime hint value of 0 may indicate that no estimate of the relative data lifetime is provided for the corresponding zone, a lifetime hint value of 1 may indicate the shortest estimated data lifetime in the memory device for the corresponding zone, and a lifetime hint value of 3F may indicate the longest data lifetime in the memory device for the corresponding zone.

In some embodiments, data region allocation component 113 determines the lifetime hint using information about the zone. For example, data region allocation component 113 estimates a relative data lifetime for a zone as compared to the relative data lifetime of other zones in the memory device. In some embodiments, the data lifetime hint is a range of values between 1 and 3F where the relative data lifetime increases and the data lifetime hint value increases. A data lifetime hint with a value of 1F, therefore has an expected data lifetime longer than a data lifetime hint with a value of 7. Data region allocation component 113 can use information about the type of data stored, an amount of time the data is stored, and other information to determine the lifetime hint.

Data region allocation component 113 writes zone 1 data 205, zone 2 data 215, and zone 3 data 225 to first memory region 210 and does not segregate the data based on the corresponding zone. For example, data region allocation component 113 writes zone data 1 205, zone 2 data 215, and zone 3 data 225 to first memory region 210 as data region allocation component 113 receives the zone data from the host device. In some embodiments, data region allocation component 113 receives portions data for different zones sequentially and writes to first memory region 210. For example, data region allocation component 113 receives a portion of zone 2 data 215 followed by a portion of zone 3 data 225, followed by a portion of zone 1 data 205, followed by a portion of zone 3 data 225, etc. Data region allocation component 113 writes the received portions of the zone data to first memory region 210 as they come in without placing the zone data in specific areas of first memory region 210 based on the zone to which it belongs. As shown in FIG. 2, this results in the zone data being stored non sequentially (e.g., blocks of memory containing data from different zones). In some embodiments, information about the data, such as the zone to which the data belongs is stored in a data structure (e.g., first logical to physical data structure 305).

In some embodiments, data region allocation component 113 stores the received zone data (e.g., zone 1 data 205, zone 2 data 215, and zone 3 data 225) in a memory region (e.g., first memory region 210, second memory region 220, and third memory region 230) based on the lifetime hint. For example, data region allocation component 113 uses received lifetime hints associated with zone 1 data 205 to determine that zone 1 data 205 has a relatively short lifetime estimation and therefore stores zone 1 data 205 in first memory region 210.

In some embodiments, zone data stored in first memory region 210 is invalidated due to being modified/overwritten. As shown in FIG. 2, invalidated portions of memory within first memory region 210 are blank representing data stored in those portions of memory has been modified/written to a different portion of memory. In such embodiments, data region allocation component 113 may use a logical to physical (L2P) data structure to track which portions of memory have been invalidated within first memory region 210. In some embodiments, because first memory region 210 stores data with an estimated short lifetime (e.g., relative to second memory region 220 and third memory region 230), first memory region 210 has significantly more invalidated data than the other memory regions (e.g., second memory region 220 and third memory region 230). In some embodiments, first memory region 210 is a relatively small portion of the overall memory such that the invalidations in first memory region 210 do not significantly affect the write amplification for the overall memory. For example, first memory region 210 is 10% of the total memory stored in all memory regions (e.g., first memory region 210, second memory region 220, and third memory region 230).

In some embodiments first memory region 210 is a logical block addressable region such that data region allocation component 113 can track which portions of memory hold data corresponding to each of the zones. For example, data region allocation component 113 uses a logical to physical data structure to map the relationship between the logical block where data is stored and the zone to which the data belongs. In some embodiments, data region allocation component 113 also tracks the lifetime hints for the zones. For example, data region allocation component 113 associates the logical blocks with a zone and the corresponding lifetime hint for the zone. Further details with respect to the logical to physical data structure are discussed with reference to FIG. 3.

In some embodiments, first memory region 210 is a non-volatile memory element with better program erase cycle performance than the other memory regions (e.g., second memory region 220 and third memory region 230). For example, first memory region 210 is an SLC, DRAM, 3D cross-point, or similar non-volatile memory element. In such embodiments, second memory region 220 and third memory region 230 are non-volatile memory elements with worse program erase cycle performance such as MLC, TLC, QLC, or PLC non-volatile memory elements. In some embodiments, second memory region 220 and third memory region 230 are non-volatile memory elements are non-volatile memory elements with higher bit density and therefore more storage capacity (e.g., MLC, TLC, QLC, or PLC non-volatile memory elements). In one embodiment, first memory region 210 is an SLC non-volatile memory element, second memory region 220 is an MLC non-volatile memory element, and third memory region 230 is a QLC non-volatile memory element.

Because first memory region 210 may only represent a small portion of the total memory available, data region allocation component 113 moves the zone data stored in first memory region 210 to another memory region when the zone has been fully written. For example, data region allocation component 113 determines that a zone has been fully written in response to receiving a finish zone command from the host device. In some embodiments, data region allocation component 113 can use the write pointer/cursor (indicating the next place in the zone to write sequentially), the zone starting point, the zone capacity to determine whether a zone has been fully written. In some embodiments, data region allocation component 113 determines that a zone has been fully written when data region allocation component 113 has not received zone data for that zone in a threshold amount of time.

In response to determining that the zone has been fully written, data region allocation component 113 determines a destination for the fully written zone data using the corresponding lifetime hint for the zone. For example, in response to determining that zone 1 is fully written, data region allocation component 113 uses the lifetime hint for zone 1 data to determine whether to store zone 1 data in second memory region 220 or third memory region 230. In some embodiments, data region allocation component 113 uses a threshold lifetime to determine the destination memory region. For example, data region allocation component 113 stores the zone data with an estimated lifetime below the threshold lifetime in second memory region 220 and stores the zone data with an estimated lifetime equal to or above the threshold lifetime in third memory region 230. The threshold lifetime can vary depending on system requirements such as desired write amplification, program erase performance, storage capacity, etc. In some embodiments, data region allocation component 113 determines the threshold lifetime based on the amount of zone data stored in each of the memory regions. For example, if third memory region 230 is nearly full, data region allocation component 113 increases the lifetime threshold so that more zone data is written to second memory region 220.

In some embodiments, zone data stored in second memory region 220 is invalidated due to being modified/overwritten. In such embodiments, data region allocation component 113 may use a logical to physical data structure to track which portions of memory have been invalidated within second memory region 220. In some embodiments, because second memory region 220 stores data with a relatively short estimated lifetime compared to third memory region 230, second memory region 220 has data invalidated more often than data third memory region 230. In some embodiments, second memory region 220 is a relatively small portion of the overall memory such that the invalidations in second memory region 220 do not significantly affect the write amplification for the overall memory. For example, second memory region 220 is 10% of the total memory stored in all memory regions. Further details with respect to the logical to physical data structure are discussed with reference to FIG. 3. In some embodiments, because second memory region 220 has a medium bit density (e.g., higher than first memory region 210 but lower than third memory region 230), the effect on write amplification is worse than it would be for a lower bit density but better than it would be for a higher bit density. 222 For example, first memory region 210 is an SLC non-volatile memory element, second memory region 220 is an MLC non-volatile memory element, and third memory region 230 is a QLC non-volatile memory element.

In some embodiments, data region allocation component 113 moves zone data from one memory region to another if there are no data invalidations for the zone data for a threshold period of time. For example, data region allocation component 113 determines that there have been no invalidations for zone 7 data in the threshold period of time and moves zone 7 data from second memory region 220 to third memory region 230. In some embodiments, data region allocation component 113 determines the threshold period of time based on system requirements such as the data pattern being written, the stream of data from the host, desired write amplification, program erase performance, storage capacity, etc.

In some embodiments, zone data stored in third memory region 230 cannot be invalidated due to being modified/overwritten without resetting the entire zone. For example, third memory region 230 does not have a logical to physical data structure to track which portions of memory have been invalidated. In such embodiments, when data region allocation component 113 overwrites zone data stored in third memory region 230, data region allocation component 113 resets the zone and rewrites the valid zone data. For example, in response to determining that portions of zone 8 data have been invalidated (e.g., receiving data modifications or overwrites for zone 8), data region allocation component 113 stores the valid data from zone 8, invalidates zone 8, and writes the stored valid data as well as the new modified data into a new zone. In some embodiments, data region allocation component 113 resets the zone in response to receiving a zone reset command from the host device.

In some embodiments, because third memory region 230 contains data with the highest lifetime estimations, the data in third memory region 230 is invalidated with the least frequency of the memory regions. Third memory region 230 therefore makes up a relatively large portion of the overall memory. For example, third memory region 230 is 80% of the total memory stored in all memory regions (e.g., first memory region 210, second memory region 220, and third memory region 230).

In some embodiments, zone data stored in third memory region 230 is invalidated due to being modified/overwritten without resetting the entire zone. In such embodiments, data region allocation component 113 may use a logical to physical data structure to track which portions of memory have been invalidated within third memory region 230. In such embodiments, third memory region 230 and its associated logical to physical data structure act in a similar method as second memory region 220. Further details with respect to the logical to physical data structure are discussed with reference to FIG. 3.

In some embodiments, data region allocation component 113 determines whether the number of invalidations for a zone in the threshold period of time satisfies the threshold number of zone invalidations. For example, data region allocation component 113 determines whether a zone in third memory region 230 has had many invalidations. In response to determining that the number of invalidations for a zone satisfies the threshold number of zone invalidations, data region allocation component 113 moves the zone from one memory region to another. For example, data region allocation component 113 determines that zone 7 data has had multiple invalidations in a short period of time and moves zone 7 data to second memory region 220. In some embodiments, data region allocation component 113 moves the zone data from one memory region to another through garbage collection (e.g., moving valid portions of zone data to another memory region).

In some embodiments, data region allocation component 113 can dynamically reconfigure the sizes of first memory region 210, second memory region 220, and third memory region 230 based on the needs of the system. For example, data region allocation component 113 can reconfigure portions of second memory region 220 as portions of first memory region 210. In some embodiments, data region allocation component 113 changes the type of non-volatile memory element of a memory region. For example, data region allocation component 113 reconfigures a portion of second memory region 220, composed of MLCs, into a non-volatile memory element SLCs so that the reconfigured portion of second memory region 220 acts as a portion of first memory region 210 (i.e., increasing the size of first memory region 210 and decreasing the size of second memory region 220).

In some embodiments, data region allocation component 113 reconfigures the sizes of first memory region 210, second memory region 220, and third memory region 230 based on the amount of data received from the host device and the lifetime hints for the data. For example, if data region allocation component 113 receives more than a threshold amount of data from the host device with relatively short data lifetimes, data region allocation component 113 can reconfigures portions of third memory region 230 to second memory region 220 to handle any overflow. In such embodiments, data region allocation component 113 can also reconfigure the portions back to second memory region 220 once the overflow has passed.

Figure 3:
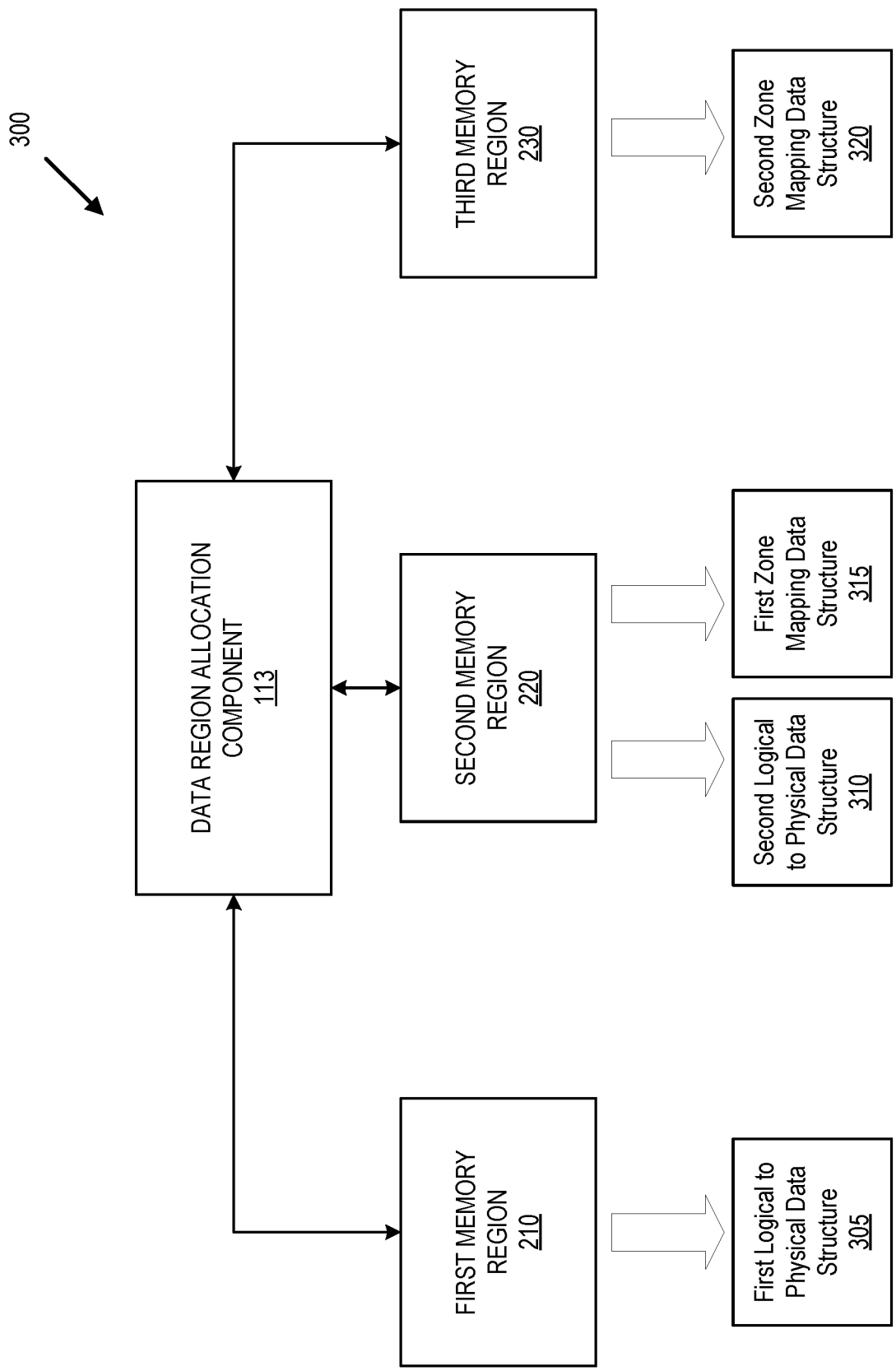
FIG. 3 illustrates another example system for memory device region allocation using lifetime hints in accordance with some embodiments of the present disclosure.

FIG. 3 illustrates another example system 300 for memory device region allocation using lifetime hints in accordance with some embodiments of the present disclosure. Exemplary system 300 includes first logical to physical data structure 305 used by data region allocation component to track metadata for first memory region 210. Exemplary system 300 also includes second logical to physical data structure 310 and first zone mapping data structure 315 used by data region allocation component to track metadata for second memory region 220. Exemplary system 300 also includes second zone mapping data structure 320 used by data region allocation component to track metadata for third memory region 230. As described with reference to FIG. 2, although three memory regions are illustrated, embodiments can have any number of memory regions greater than two. In such embodiments, each of the memory regions is coupled with an additional logical to physical data structure, an additional zone mapping data structure, or both. In some embodiments, first and second logical to physical data structures 305 and 310 and first and second zone mapping structures 315 and 320 are stored in local memory, such as local memory 119 of FIG. 1. In some embodiments, first and second logical to physical data structures 305 and 310 and first and second zone mapping structures 315 and 320 are stored in a memory device, such as a DRAM component of memory device 140 of FIG. 1. In some embodiments one or more of first and second logical to physical data structures 305 and 310 and first and second zone mapping structures 315 and 320 are stored in local memory and one or more are stored in a memory device.

Data region allocation component 113 uses first logical to physical data structure 305 to map the logical portions of memory to physical portions of memory. For example, data region allocation component 113 stores the mappings for zone 1 data 205, zone 2 data 215, and zone 3 data 225 in three separate portions of first logical to physical data structure 305. In some embodiments, the mappings are stored sequentially such that the mappings (e.g., physical block identifiers) for where the zone 1 data 205 is stored in the first portion of first logical to physical data structure 305, mappings (e.g., physical block identifiers) for where zone 2 data 215 is stored in the next portion of first logical to physical data structure 305, etc. In some embodiments, data region allocation component 113 stores lifetime hints for the zones in first logical to physical data structure 305. In some embodiments, first logical to physical data structure 305 and second logical to physical data structure 310 are both included in a single logical to physical data structure for all the memory regions. As discussed above with reference to FIG. 2, in some embodiments, data region allocation component 113 also stores information about which portions of first memory region 210 have been invalidated in first logical to physical data structure 305.

Data region allocation component 113 uses second logical to physical data structure 310 to map the logical portions of memory to physical portions of memory for zones with invalidated data. For example, as shown in FIG. 2, parts of zone 5 data have been invalidated in second memory region 220 and data region allocation component 113 uses second logical to physical data structure 310 to map the valid data for zone 5 data to their corresponding locations. Data region allocation component 113 also maps the zone data stored in second memory region 220 using first zone mapping data structure 315. For example, for zones with no invalidations, first zone mapping data structure 315 maps the location of the zones to physical blocks within second memory region 220. In some embodiments, for zones with invalidations, first zone mapping data structure 315 contains a pointer or other mapping to the location in second logical to physical data structure 310 where the zone data for the corresponding zone is stored. For example, as shown in FIG. 2, parts of zone 5 data have been invalidated in second memory region 220 and the portion of first zone mapping data structure 315 corresponding with zone 5 includes a pointer to the location in second logical to physical data structure 310 holding the mapping information for the valid data in zone 5.

Data region allocation component 113 maps the zone data stored in third memory region 230 using second zone mapping data structure 320. For example, second zone mapping data structure 320 maps the location of the zones to physical blocks within third memory region 230. In some embodiments, third memory region 230 also has a logical to physical data structure which operates in the same manner as second logical to physical data structure 310. In such embodiments, second zone mapping data structure 320 also operates in the same manner as first zone mapping data structure 315.

Figure 4:
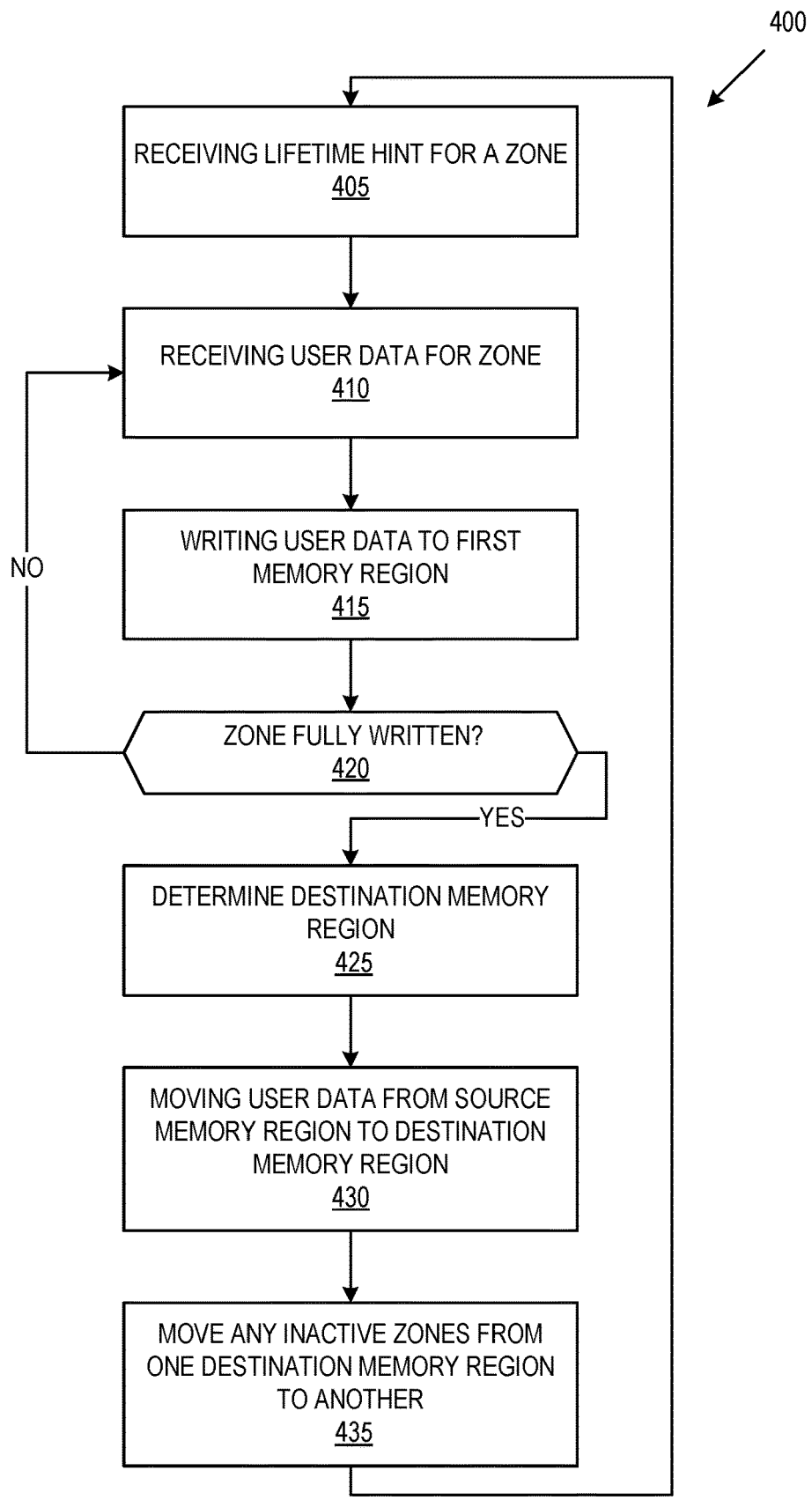
FIG. 4 is a flow diagram of an example method to allocate data to memory device regions using lifetime hints in accordance with some embodiments of the present disclosure.

FIG. 4 is a flow diagram of an example method 400 to allocate data to memory device regions using lifetime hints, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data region allocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives a lifetime hint for a zone. For example, data region allocation component 113 receives the lifetime hint from a host device, such as host system 120 of FIG. 1. In some embodiments, data region allocation component 113 receives the lifetime hint in a zone management send command received from the host device (e.g., a zone management send command under a ZNS protocol). The zone is a grouping of data based on the usage and frequency of access of the associated zone data (e.g., zone 1 data 205, zone 2 data 215, and zone 3 data 225 of FIG. 2). For example, a zone is associated with an application running on the host device (e.g., a computer running a word processing application) and the zone includes data associated with the running of that application (e.g., word processing application files). In some embodiments, a zone is assigned for multiple applications with similar data usage and frequency of access. In some embodiments, a single application has data stored in multiple zones. In some embodiments, the zone is a portion of memory identified under ZNS protocol.

In some embodiments, the lifetime hint includes a lifetime hint value which specifies whether a data lifetime estimate for the zone exists and the value of the relative data lifetime of the zone as compared to the relative data lifetime of other zones in the memory device. For example, a lifetime hint value of 0 may indicate that no estimate of the relative data lifetime is provided for the corresponding zone, a lifetime hint value of 1 may indicate the shortest estimated data lifetime in the memory device for the corresponding zone, and a lifetime hint value of 3F may indicate the longest data lifetime in the memory device for the corresponding zone.

In some embodiments, the processing device determines the lifetime hint using information about the zone. For example, data region allocation component 113 estimates a relative data lifetime for a zone as compared to the relative data lifetime of other zones in the memory device. In some embodiments, the data lifetime hint is a range of values between 1 and 3F where the relative data lifetime increases and the data lifetime hint value increases. A data lifetime hint with a value of 1F, therefore has an expected data lifetime longer than a data lifetime hint with a value of 7. The processing device can use information about the type of data stored, an amount of time the data is stored, and other information to determine the lifetime hint.

At operation 410, the processing device receives user data for the zone. For example, data region allocation component 113 receives user data (e.g., zone 1 data 205, zone 2 data 215, or zone 3 data 225 of FIG. 2) from the host device. In some embodiments, the processing device receives a constant stream of data from the host device that includes data from multiple zones. In some embodiments, the user data includes an identifier indicating the zone to which the user data belongs.

At operation 415, the processing device writes the user data to a first memory region. For example, data region allocation component 113 writes zone data, such as zone 1 data 205 of FIG. 2, to a first memory region, such as first memory region 210 of FIG. 2. In some embodiments, the processing device determines the first memory region based on the received user data. For example, data region allocation component 113 uses received lifetime hints associated with the user data to determine that the user data has a relatively short lifetime estimation and therefore stores the user data in the memory region. In such embodiments, the processing device may also store the user data directly into a second memory region (e.g., if the user data has a relatively long lifetime estimation).

In some embodiments the first memory region is a logical block addressable region such that the processing device can track which portions of memory hold data corresponding to each of the zones. For example, data region allocation component 113 uses a logical to physical data structure to map the relationship between the logical block where data is stored and the zone to which the data belongs. In some embodiments, the processing device also tracks the lifetime hints for the zones. For example, data region allocation component 113 associates the logical blocks with a zone and the corresponding lifetime hint for the zone. Further details with respect to the logical to physical data structure are discussed with reference to FIG. 3.

In some embodiments, the first memory region is a non-volatile memory element with better program erase cycle performance than the destination memory regions. For example, the first memory region is an SLC, DRAM, 3D cross-point, or similar non-volatile memory element. In such embodiments, memory regions other than the first memory region are non-volatile memory elements with worse program erase cycle performance such as MLC, TLC, QLC, or PLC non-volatile memory elements. In some embodiments, the memory regions other than the first memory region are non-volatile memory elements are non-volatile memory elements with higher bit density and therefore more storage (e.g., MLC, TLC, QLC, or PLC non-volatile memory elements).

At operation 420, the processing device determines whether the zone is fully written. For example, data region allocation component 113 determines that a zone has been fully written in response to receiving a finish zone command from the host device. In some embodiments, the processing device can use the write pointer (indicating the next place in the zone to write sequentially), the zone starting point, the zone capacity to determine whether a zone has been fully written. In some embodiments, the processing device determines that a zone has been fully written when it has not received zone data for that zone in a threshold amount of time. If the processing device determines the zone is fully written, the method 400 proceeds to operation 425. If the processing device determines the zone is not fully written, the method 400 instead returns to operation 410.

At operation 425, the processing device determines a destination memory region. For example, data region allocation component 113 uses the lifetime hint for the zone to which the user data belongs to determine whether to store the user data in a second memory region, such as second memory region 220 of FIG. 2, or a third memory region, such as third memory region 230 of FIG. 2. In some embodiments, the processing device uses a threshold lifetime to determine the destination memory region. For example, data region allocation component 113 stores the user data in the second memory region if the user data has an estimated lifetime below the threshold lifetime and stores the user data in the third memory region if the user data has an estimated lifetime equal to or above the threshold lifetime. The threshold lifetime can vary depending on system requirements such as desired write amplification, program erase performance, storage capacity, etc. In some embodiments, the processing device determines the threshold lifetime based on the amount of zone data stored in each of the memory regions. Each memory region may be composed of a different non-volatile memory element. In one embodiment, the first memory region (e.g., source memory region) is an SLC non-volatile memory element, the second memory region is an MLC non-volatile memory element, and the third memory region is a QLC non-volatile memory element.

At operation 430, the processing device moves user data from the source memory region to the determined destination memory region. For example, data region allocation component 113 reads the user data from the first memory region and sequentially writes the user data to the determined destination memory region. In some embodiments, the processing device maps the user data stored in the determined destination memory region using a zone mapping data structure. For example, the zone mapping data structure maps the location of the zones to physical blocks within the determined destination memory region. In some embodiments, the processing device also uses a logical to physical data structure to map the logical portions of memory to physical portions of memory for zones with invalidated data. For example, data region allocation component 113 uses a logical to physical data structure to map the valid data for a zone to its corresponding locations. In some embodiments, for zones with invalidations, the zone mapping data structure contains a pointer towards the location in the logical to physical data structure where the zone data for the corresponding zone is stored. In some embodiments, at least one of the destination memory regions uses a logical to physical data structure and a zone mapping data structure and at least one other of the destination memory regions only uses a zone mapping data structure. For example, the second memory region has a shorter estimated lifetime than the third memory and uses a zone mapping data structure to track the zone data for fully valid zones and a logical to physical data structure to track the zone data for zones with invalidated data. The third memory region therefore has a longer estimated lifetime than the second memory and only uses a zone mapping data structure to track the zone data and resets the zone in the event of data invalidations.

At operation 435, the processing device moves any inactive zones from one destination memory region to another. For example, data region allocation component 113 determines whether there have been invalidations for any zones in the second memory region in the threshold period of time. In some embodiments, the processing device determines the threshold period of time based on system requirements such as the data pattern being written, the stream of data from the host, desired write amplification, program erase performance, storage capacity, etc. If the processing device determines that that there have been no invalidations of data for a given zone for the threshold period of time (i.e., the user data of a zone in the second memory region has become cold/inactive), data region allocation component 113 moves the user data from the second memory region to the third memory region. In some embodiments, if the processing device determines that there are no zones to be moved to another region (e.g., data invalidations, threshold time not satisfied, etc.), the method 400 returns to operation 405 to receive a lifetime hint for another zone. In some embodiments, the processing device has already received a lifetime hint for the next zone and the method 400 instead returns to operation 410.

In some embodiments, if the processing device determines that invalidations for a zone satisfy a threshold number of invalidations, the processing device moves the zone to another destination memory region (e.g., an updated destination memory region). For example, data region allocation component 113 determines that a zone in the third memory region (e.g., third memory region 230) has had multiple invalidations and moves the zone to second memory region (e.g., second memory region 220). In some embodiments, the processing device moves the zone data from one memory region to another through garbage collection (e.g., moving valid portions of zone data to another memory region).

Figure 5:
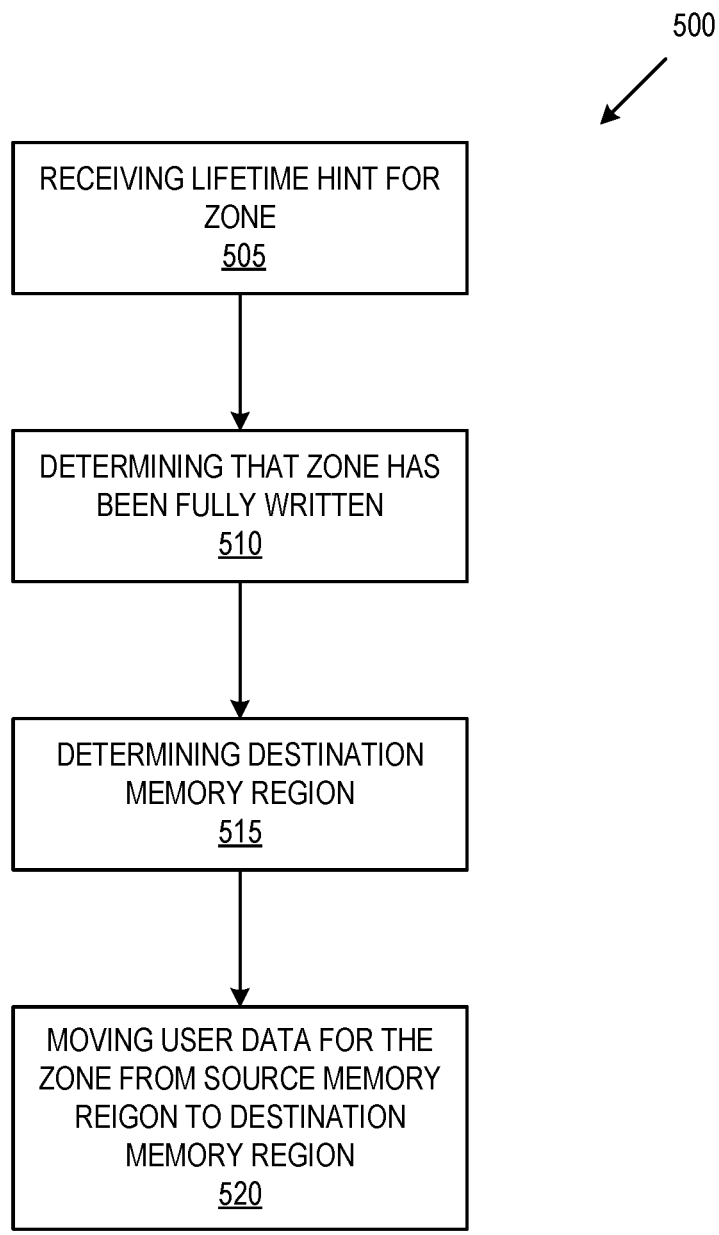
FIG. 5 is a flow diagram of an example method to allocate data to memory device regions using lifetime hints in accordance with some embodiments of the present disclosure.

FIG. 5 is a flow diagram of an example method 500 to allocate data to memory device regions using lifetime hints, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the data region allocation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives a lifetime hint for a zone. For example, data region allocation component 113 receives the lifetime hint from a host device, such as host system 120 of FIG. 1. In some embodiments, data region allocation component 113 receives the lifetime hint in a zone management send command received from the host device (e.g., a zone management send command under a ZNS protocol). The zone is a grouping of data based on the usage and frequency of access of the associated zone data (e.g., zone 1 data 205, zone 2 data 215, and zone 3 data 225 of FIG. 2). For example, a zone is associated with an application running on the host device (e.g., a computer running a word processing application) and the zone includes data associated with the running of that application (e.g., word processing application files). In some embodiments, a zone is assigned for multiple applications with similar data usage and frequency of access. In some embodiments, a single application has data stored in multiple zones. In some embodiments, the zone is a portion of memory identified under ZNS protocol.

In some embodiments, the lifetime hint includes a lifetime hint value which specifies whether a data lifetime estimate for the zone exists and the value of the relative data lifetime of the zone as compared to the relative data lifetime of other zones in the memory device. For example, a lifetime hint value of 0 may indicate that no estimate of the relative data lifetime is provided for the corresponding zone, a lifetime hint value of 1 may indicate the shortest estimated data lifetime in the memory device for the corresponding zone, and a lifetime hint value of 3F may indicate the longest data lifetime in the memory device for the corresponding zone.

In some embodiments, the processing device determines the lifetime hint using information about the zone. For example, data region allocation component 113 estimates a relative data lifetime for a zone as compared to the relative data lifetime of other zones in the memory device. The processing device can use information about the type of data stored, an amount of time the data is stored, and other information to determine the lifetime hint.

At operation 510, the processing device determines that a zone has been fully written. For example, data region allocation component 113 determines that a zone has been fully written in response to receiving a finish zone command from the host device. In some embodiments, the processing device can use the write pointer (indicating the next place in the zone to write sequentially), the zone starting point, the zone capacity to determine whether a zone has been fully written. In some embodiments, the processing device determines that a zone has been fully written when it has not received zone data for that zone in a threshold amount of time. If the processing device determines the zone is fully written, the method 400 proceeds to operation 425. If the processing device determines the zone is not fully written, the method 400 instead returns to operation 410.

Figure 6:
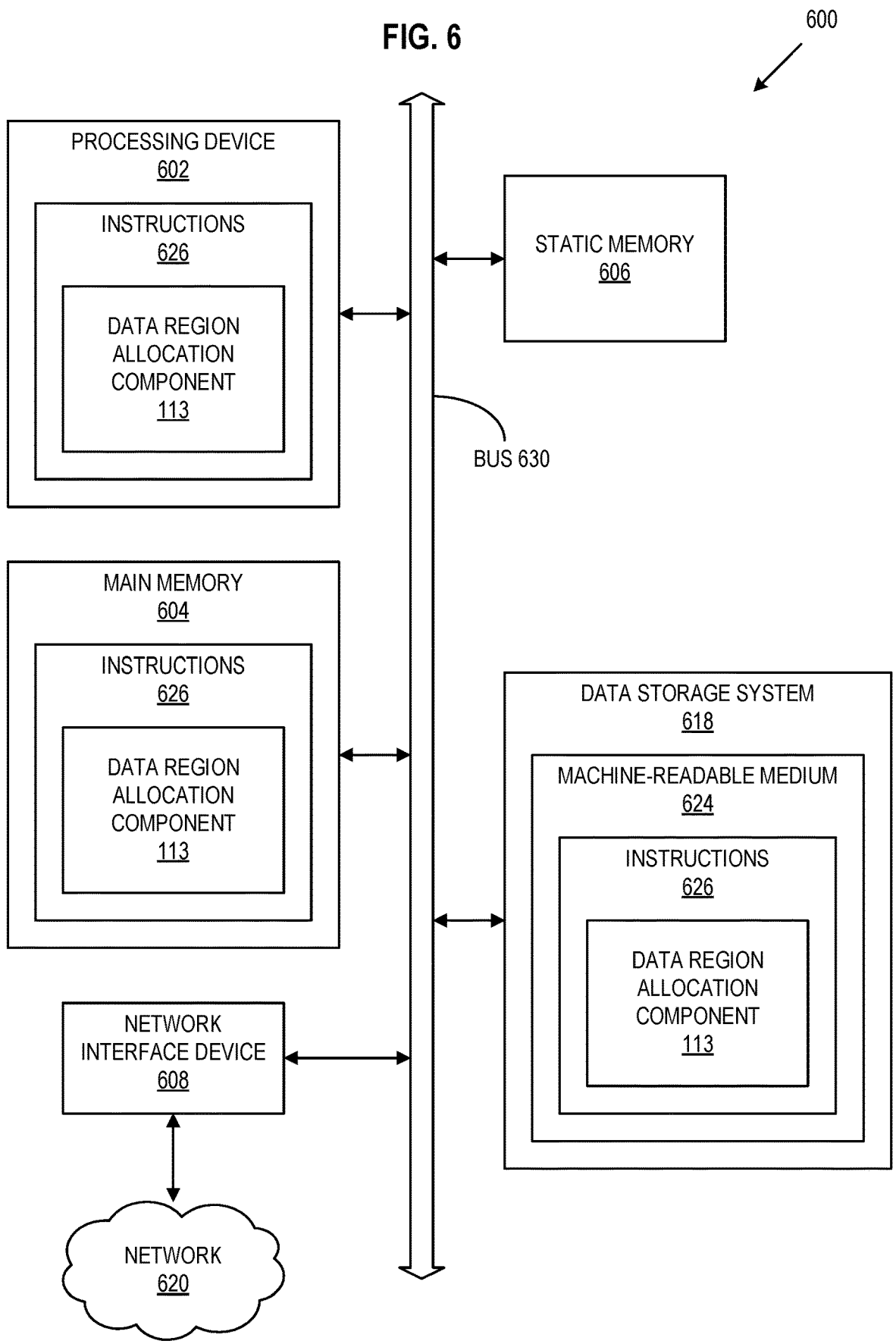
FIG. 6 is a block diagram of an example computer system in which embodiments of the present disclosure may operate.

At operation 515, the processing device determines the destination memory region. For example, data region allocation component 113 uses the lifetime hint for the zone to which the user data belongs to determine whether to store the user data in a second memory region, such as second memory region 220 of FIG. 2, or a third memory region, such as third memory region 230 of FIG. 2. In some embodiments, the processing device uses a threshold lifetime to determine the destination memory region. For example, data region allocation component 113 stores the user data in the second memory region if the user data has an estimated lifetime below the threshold lifetime and stores the user data in the third memory region if the user data has an estimated lifetime equal to or above the threshold lifetime. The threshold lifetime can vary depending on system requirements such as desired write amplification, program erase performance, storage capacity, etc. In some embodiments, the processing device determines the threshold lifetime based on the amount of zone data stored in each of the memory regions. Each of the memory regions may be composed of a different non-volatile memory element. In one embodiment, the first memory region (e.g., source memory region) is an SLC non-volatile memory element, the second memory region is an MLC non-volatile memory element, and the third memory region is a QLC non-volatile memory element. At operation 520, the processing device moves user data for the zone from the source memory region to the destination memory region. For example, data region allocation component 113 reads the user data from the source memory region and sequentially writes the user data to the determined destination memory region. In some embodiments, the processing device maps the user data stored in the determined destination memory region using a zone mapping data structure. For example, the zone mapping data structure maps the location of the zones to physical blocks within the determined destination memory region. In some embodiments, the processing device also uses a logical to physical data structure to map the logical portions of memory to physical portions of memory for zones with invalidated data. For example, data region allocation component 113 uses a logical to physical data structure to map the valid data for a zone to its corresponding locations. In some embodiments, for zones with invalidations, the zone mapping data structure contains a pointer towards the location in the logical to physical data structure where the zone data for the corresponding zone is stored. In some embodiments, at least one of the destination memory regions uses a logical to physical data structure and a zone mapping data structure and at least one other of the destination memory regions only uses a zone mapping data structure. For example, the second memory region has a shorter estimated lifetime than the third memory and uses a zone mapping data structure to track the zone data for fully valid zones and a logical to physical data structure to track the zone data for zones with invalidated data. The third memory region therefore has a longer estimated lifetime than the second memory and only uses a zone mapping data structure to track the zone data and resets the zone in the event of data invalidations. FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the data region allocation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a data region allocation component (e.g., the data region allocation component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 400 and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, from a host device, a lifetime hint for a zone of a plurality of zones in a memory device, wherein the lifetime hint is an estimation of a length of time user data for the zone will be valid;
    determining that the zone has been fully written to a source memory region, wherein data stored in the source memory region is not segregated by a corresponding zone and wherein the source memory region comprises a first logical to physical data structure that tracks a corresponding zone of the plurality of zones for data in the source memory region;
    determining a destination memory region, of a plurality of memory regions, to store the user data for the zone using the lifetime hint, wherein data stored in the destination memory region is segregated by the corresponding zone; and
    moving the user data for the zone from the source memory region to the destination memory region.

2. The method of claim 1, wherein the source memory region is a first type of non-volatile memory element, and the plurality of memory regions comprise a first destination memory region, which is a second type of non-volatile memory element and a second destination memory region, which is a third type of non-volatile memory element.

3. The method of claim 2, wherein the first destination memory region comprises a second logical to physical data structure and a first zone mapping data structure, and the second destination memory region comprises a second zone mapping data structure.

4. The method of claim 3, wherein the second logical to physical data structure tracks invalidated data in the first destination memory region and the first zone mapping data structure tracks where zones of the plurality of zones are stored in the first destination memory region.

5. The method of claim 3, wherein the second zone mapping data structure tracks where zones of the plurality of zones are stored in the second destination memory region.

6. The method of claim 1, further comprising:
    determining an invalidation time for the user data, wherein the invalidation time is a time since data in the user data has been invalidated;

determining an updated destination memory region of the plurality of memory regions, to store the user data for the zone in response to the invalidation time satisfying a threshold time; and moving the user data for the zone from the destination memory region to the updated destination memory region.

7. The method of claim 6, wherein determining the updated destination memory region is further based on the lifetime hint.

8. A non-transitory computer-readable storage medium comprising instructions that, when executed by a processing device, cause the processing device to:

receive, from a host device, a lifetime hint for a zone of a plurality of zones in a memory device, wherein the lifetime hint is an estimation of a length of time user data for the zone will be valid;

determine that the zone has been fully written to a source memory region, wherein data stored in the source memory region is not segregated by a corresponding zone and wherein the source memory region comprises a first logical to physical data structure that tracks a corresponding zone of the plurality of zones for data in the source memory region;

determine a destination memory region, of a plurality of memory regions, to store the user data for the zone using the lifetime hint, wherein data stored in the destination memory region is segregated by the corresponding zone; and move the user data for the zone from the source memory region to the destination memory region.

9. The non-transitory computer-readable storage medium of claim 8, wherein the source memory region is a first type of non-volatile memory element, and the plurality of memory regions comprise a first destination memory region, which is a second type of non-volatile memory element and a second destination memory region, which is a third type of non-volatile memory element.

10. The non-transitory computer-readable storage medium of claim 9, wherein the first destination memory region comprises a second logical to physical data structure and a first zone mapping data structure, and the second destination memory region comprises a second zone mapping data structure.

11. The non-transitory computer-readable storage medium of claim 10, wherein the second logical to physical data structure tracks invalidated data in the first destination memory region and the first zone mapping data structure tracks where zones of the plurality of zones are stored in the first destination memory region.

12. The non-transitory computer-readable storage medium of claim 10, wherein the second zone mapping data structure tracks where zones of the plurality of zones are stored in the second destination memory region.

13. The non-transitory computer-readable storage medium of claim 8, wherein the processing device is further to:

determine an invalidation time for the user data, wherein the invalidation time is a time since data in the user data has been invalidated;

determine an updated destination memory region of the plurality of memory regions, to store the user data for the zone in response to the invalidation time satisfying a threshold time; and move the user data for the zone from the destination memory region to the updated destination memory region.

14. The non-transitory computer-readable storage medium of claim 13, wherein determining the updated destination memory region is further based on the lifetime hint.

15. A system comprising:

a plurality of memory devices; and a processing device, operatively coupled with the plurality of memory devices, to:

receive, from a host device, a lifetime hint for a zone of a plurality of zones in a memory device, wherein the lifetime hint is an estimation of a length of time user data for the zone will be valid;

determine that the zone has been fully written to a source memory region, wherein the source memory region is a first type of non-volatile memory element, wherein data stored in the source memory region is not segregated by a corresponding zone, and wherein the source memory region comprises a first logical to physical data structure that tracks a corresponding zone of the plurality of zones for data in the source memory region;

determine a destination memory region, of a plurality of memory regions, to store the user data for the zone using the lifetime hint, wherein the plurality of memory regions comprise a first destination memory region, which is a second type of non-volatile memory element and a second destination memory region, which is a third type of non-volatile memory element; and move the user data for the zone from the source memory region to the destination memory region.

16. The system of claim 15, wherein the first destination memory region comprises a second logical to physical data structure and a first zone mapping data structure, and the second destination memory region comprises a second zone mapping data structure.

17. The system of claim 16, wherein the second logical to physical data structure tracks invalidated data in the first destination memory region and the first zone mapping data structure tracks where zones of the plurality of zones are stored in the first destination memory region.

18. The system of claim 15, wherein the processing device is further to:

determine an invalidation time for the user data, wherein the invalidation time is a time since data in the user data has been invalidated;

determine an updated destination memory region of the plurality of memory regions, to store the user data for the zone in response to the invalidation time satisfying a threshold time; and move the user data for the zone from the destination memory region to the updated destination memory region.

19. The system of claim 18, wherein determining the updated destination memory region is further based on the lifetime hint.

20. The system of claim 15, wherein the second zone mapping data structure tracks where zones of the plurality of zones are stored in the second destination memory region.

* * * * *